United States Patent [19]
Takahashi et al.

[11] Patent Number: 5,508,835
[45] Date of Patent: Apr. 16, 1996

[54] MASTER CLOCK DISTRIBUTING METHOD AND APPARATUS USING SAME

[75] Inventors: Yasushi Takahashi, Hachioji; Hiroyuki Itoh, Akigawa, both of Japan

[73] Assignee: Hitachi, Ltd., Tokyo, Japan

[21] Appl. No.: 127,137

[22] Filed: Sep. 27, 1993

Related U.S. Application Data

[63] Continuation of Ser. No. 772,863, Oct. 8, 1991, abandoned.

[30] Foreign Application Priority Data

Oct. 17, 1990 [JP] Japan .................... 2-276294

[51] Int. Cl.⁶ .......................... H04J 14/08; H04B 10/00
[52] U.S. Cl. ...................... 359/140; 359/158; 359/163; 385/14
[58] Field of Search .................... 359/115, 118, 359/120, 123, 124, 125, 132, 140, 158, 163, 173, 162; 385/24, 14, 94

[56] References Cited

U.S. PATENT DOCUMENTS

| | | | |
|---|---|---|---|
| 4,393,515 | 7/1983 | De Neumann | 359/123 |
| 4,695,120 | 9/1987 | Holder | 385/14 |
| 4,755,704 | 7/1988 | Flora et al. | 375/107 |
| 4,904,036 | 2/1990 | Blonder | 385/14 |
| 4,911,512 | 3/1990 | Yamamoto et al. | 385/14 |
| 4,959,540 | 9/1990 | Fan et al. | 250/227.12 |
| 4,977,581 | 12/1990 | Cerminara | 375/107 |
| 5,077,529 | 12/1991 | Ghoshal et al. | 375/118 |
| 5,122,679 | 6/1992 | Ishii et al. | 307/269 |

FOREIGN PATENT DOCUMENTS

| | | | |
|---|---|---|---|
| 8706411 | 10/1987 | European Pat. Off. | 359/163 |
| 1156870 | 7/1986 | Japan | G02B 6/12 |
| 8605939 | 10/1986 | Japan | H04J 3/04 |

OTHER PUBLICATIONS

IBM Technical Disclosure Bulletin, vol. 32 No. 12, May 1990 pp. 104–105 "Hermitically Sealed High Performance Computer Module with Optical Interface".
Optical Engineering, vol. 25 No. 10 Oct. 1986, pp. 1086–1102, "Hartmann:" Digital high speed interconnects: a study of the optical alternative.
Optical Clock Distribution System, Motorola Inc. Government Electronic Group Apr. 1987.
Optical Interconnections for VLSI Systems, Goodman et al. IEEE 1984, vol. 72, No. 7 pp. 850–866.
IBM Technical Disclosure Bulletin vol. 26 No. 4 Sep. 1983.
Prucnal et al., Fibre-optic network using all-optical processing, "Lightwave Communication Research Laboratory" Apr. 28, 1987.

Primary Examiner—Leslie Pascal
Assistant Examiner—Rafael Bacares
Attorney, Agent, or Firm—Antonelli, Terry, Stout & Kraus

[57] ABSTRACT

A logic processing apparatus comprises a plurality of integrated circuits, a multi-phase clock generator for distributing clock signals having different phases from one another to the respective integrated circuits, and a package, for air tight sealing the multi-phase clock generator and the plurality of integrated circuits, which has an optical signal transmissible window for transmitting the master clock signal to the multi-phase clock generator through the optical transmitting line.

4 Claims, 4 Drawing Sheets

5,508,835

MASTER CLOCK DISTRIBUTING METHOD AND APPARATUS USING SAME

This application is a continuation of Ser. No. 07/772,863, filed Oct. 8, 1991, now abandoned.

BACKGROUND OF THE INVENTION

The present invention relates to a clock distributing method for use in a logic processing apparatus, and more particularly to an effective method for distributing high speed clock signals.

In a logic processing apparatus, a master clock signal for determining timing of executing processing is important. Since not only the cycle but also the phase plays an important role, deterioration in waveform occurring during distribution of the master clock signal badly affects the processing. For this reason, multi-phase clock signals have conventionally been distributed from a master clock distributing unit to respective logic processing units. However, with increasing processing speeds, clock signal distribution has become more and more difficult, which leads to a need to take into consideration the application of an optical signal to clock signal distribution, and a variety of investigations have already been made into this technical area. A basic concept of the application of an optical signal to clock signal distribution is similar to that shown in J. W. Goodman, et al., "Optical Interconnections for VLSI Systems", Proc. of IEEE, vol. 72, No. 7, pp. 850–866, (July 1984). Particularly, FIG. 7 on page 859 may be regarded as the most basic construction.

FIG. 7 illustrates a construction of a prior art example. An optical signal from a master clock source 16 is delivered to respective logic processing units by means of fibers 13. The fibers 13 are coupled to photoelectric converters 12 where the optical signal is converted to an electric signal.

In this construction, the clock signal is directly distributed from the master clock source to the integrated circuit, however, no consideration is to provision of multi-phase clocks which are necessary for the processing. Also, other means essential to the reliability of integrated circuits, such as air tight sealing is not discussed. However, for putting the optical clock signal distribution into practice, it is necessary to distribute an optical clock signal without damaging the construction, such as air tight sealing and heat discharge, and to generate multi-phase clock signals with highly accurate phases.

SUMMARY OF THE INVENTION

The above-mentioned problem can be solved by a method for distributing an optical clock signal by means of optical transmission lines having different optical paths (lengths) and a light transmissible window formed in an air tight sealing package.

A logic processing unit branches a received optical clock signal and inputs branched optical clock signals to optical transmission lines respectively having: different optical paths. These inputs serve as multi-phase clock signals respectively having a phase difference equal to the difference in the optical path thereof. The optical transmission lines, since having wide bands, will not cause deterioration of the waveform of the optical signal even if it is branched, which is different from the distribution employing an electric clock. It is therefore possible to generate clock signals without a deteriorated waveform. Also, since the phase differences among branched clock signals depend on the lengths of the optical transmission lines, the phases are accurately adjustable.

DESCRIPTION OF THE PREFERRED EMBODIMENTS

Figure 1:
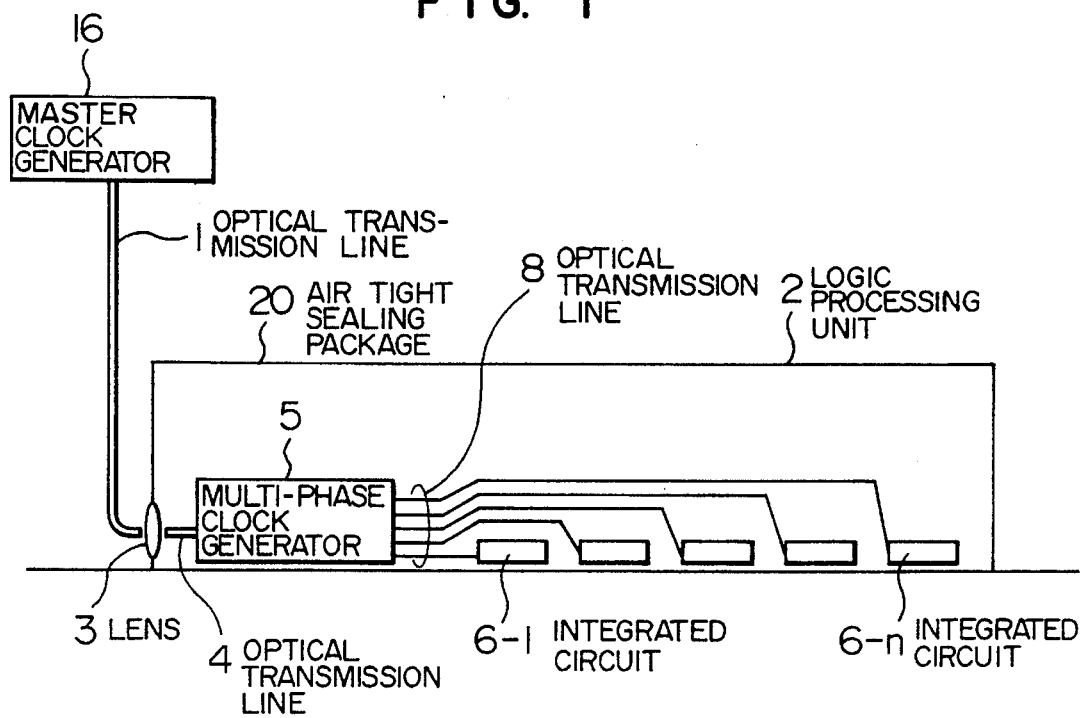
FIG. 1 is a schematic diagram illustrating the construction of a first embodiment of the invention.
Figure 2:
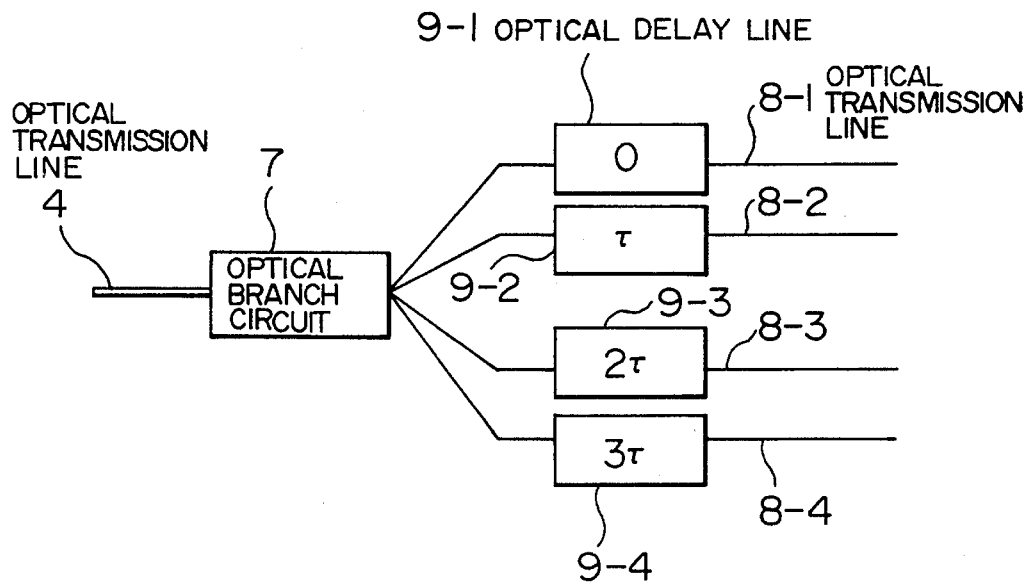
FIG. 2 is a block diagram illustrating a multi-phase clock signal generator of the first embodiment.

A first embodiment of the invention will hereinbelow be described with reference to the accompanying drawings. This embodiment is adapted to distribute a mono-phase clock signal from a reference clock signal generator and accurately generate multi-phase clock signals necessary for processing executed by a logic processing unit. FIG. 1 illustrates the whole overall construction of a logic processing unit comprising a plurality of logic processing integrated circuits built therein. FIG. 2 illustrates a multi-phase clock signal generator disposed in the logic processing unit. In FIG. 1, an optical clock signal delivered from a reference clock signal generator 16 is inputted to a logic processing unit 2 through an optical transmission line 1. The logic processing unit 2 has an air tight sealing package 20 which is provided with a light transmissible window through one side surface thereof. In the present embodiment, a lens 3 is mounted in the window formed through the side surface, and the periphery of the lens 3 and the side wall of the window is bonded by glass to thereby maintain an air tight condition.

The optical clock signal inputted inside the package 20 through the lens 3 is guided by an optical transmission line 4. The optical transmission line 4 is coupled to the input of a multi-phase clock signal generator 5. The output of the multi-phase clock signal generator 5 is also coupled to optical transmission lines 8, where optical clock signals outputted to the respective optical transmission lines are given predetermined delay time differences by the multi-phase clock signal generator 5. These clock signals are distributed to logic processing integrated circuits 6-1–6-n. In this event, the optical transmission lines 8 used for distribution are made equal in optical path so as to maintain the phase differences provided by the multi-phase clock signal generator 5.

FIG. 2 illustrates the internal construction of the multi-phase clock signal generator 5. The optical clock signal inputted from the optical transmission line 4 is branched into four signals by an optical branch circuit 7 and respectively inputted through optical delay lines 9-1–9-4 to optical transmission lines 8-1–8-4. The optical delay lines 9 provide predetermined delay time differences. In the present embodiment, four-phase clock signals having phase differences of $\tau$, $2\tau$ and $3\tau$ are generated. In the embodiment shown in FIG. 2, the optical transmission lines 8-1–8-4 are used as the delay lines 9-1–9-4.

Figure 3A:
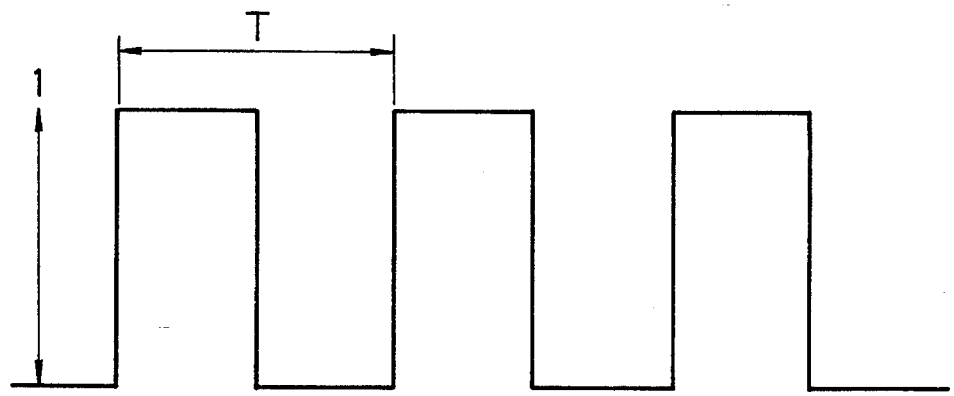
FIGS. 3A–3F are timing charts illustrating phases of clock signals used in the first embodiment.
Figure 3B:
Figure 3C:
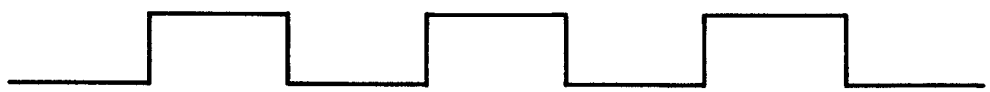
Figure 3D:
Figure 3E:
Figure 3F:

FIGS. 3A–3F illustrate the phases of optical clock signals at respective locations in the apparatus shown in FIG. 2. FIG. 3A shows the input to the optical transmission line 4, FIG. 3B the output of the branch circuit 7, and FIGS. 3C–3F the outputs of the respective optical transmission lines 8-1–8-4. Since the inputted optical clock signal is to be distributed to four outputs by the distributor 7, the amplitude of each of the four outputs is one quarter as large as the input. The optical delay lines 9-1–9-4 provide delay times of 0, τ, 2τ and 3τ, respectively, thereby generating clock signals of four different phases. In this example, the clock signal speed is supposed to be 600 Mb/s. The cyclic period is 1.67 ns. Therefore, τ(¼T) is 0.42 ns which corresponds to 8.3 cm in terms of the optical path, which can be controlled with a sufficient accuracy.

In the present embodiment, the optical clock signal can be inputted to the logic processing unit without damaging air tight sealing and without producing heat discharge effects, and multi-phase clock signals can be accurately generated on the reception side, so that the clock signal distributing apparatus of the invention is effective in use for a high speed system. Further, there is an additional advantage in that the number of lines from the reference clock signal generator can be reduced, which further results in simplifying the overall construction of the apparatus and reducing the size of the same.

Figure 4:
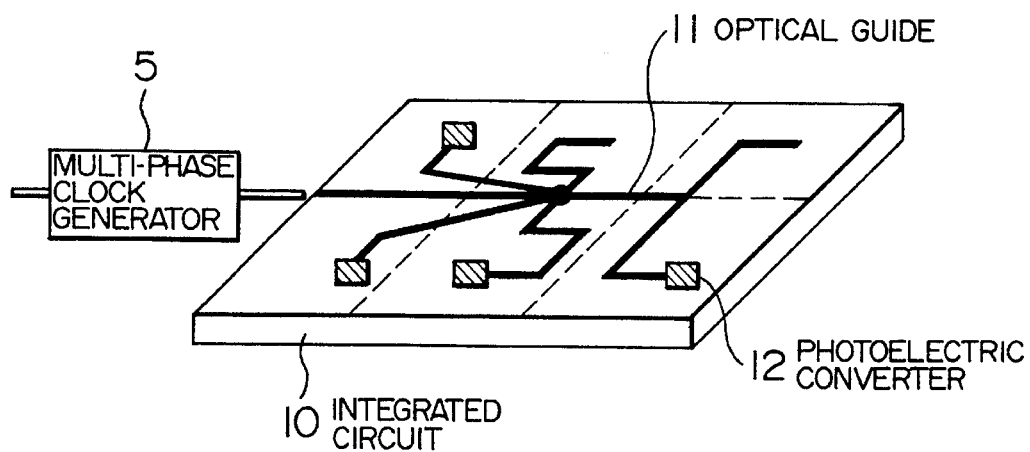
FIG. 4 is a schematic diagram illustrating the construction of a second embodiment of the invention.

FIG. 4 illustrates the construction of a second embodiment. This is an example of distributing multi-phase clock signals from a multi-phase clock signal generator 5 to the inside of logic integrated circuits. In this embodiment, optical guides are formed by diffusing impurities into insulating $SiO_2$ film among circuits. First, an optical clock signal inputted to an integrated circuit 10 is delivered to a central portion of the integrated circuit 10 through optical guide 11 and branched therefrom. This construction makes it possible to make the lengths of transmission lines equal. The optical clock signal delivered on the insulating film is converted to an electric clock signal by a photoelectric convertor 12 provided in each of the blocks (functional blocks of the integrated circuit) and distributed to circuit in the blocks. Since each block is a narrow region, the clock signal can be electrically distributed.

Figure 5:
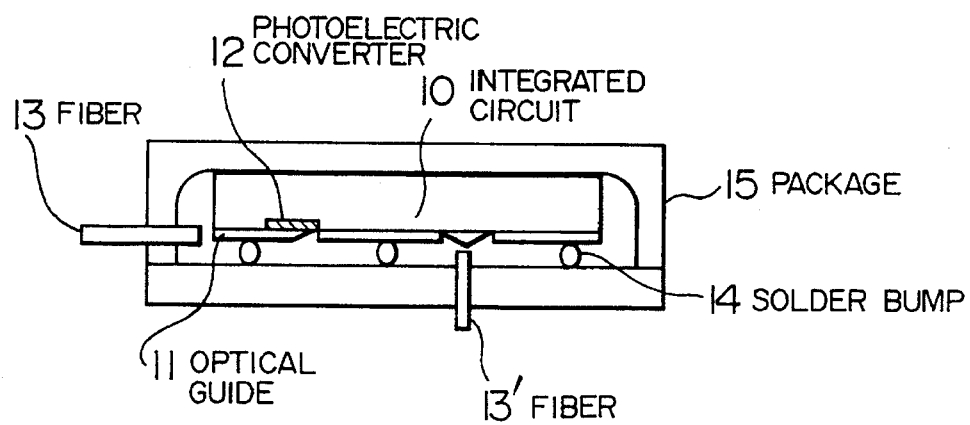
FIG. 5 is a cross-sectional view of the second embodiment.

FIG. 5 illustrates the construction in cross section of the integrated circuit 10 and a package 15 thereof. As shown in the drawing, an optical clock signal is inputted into the package 15 through a fiber 13 and is coupled to an optical guide 11 formed on an insulating film of the integrated circuit 10. The end surface of the optical guide 11 is sloped by approximately 45°, and the optical clock signal is reflected by this sloped surface to be incident on a photo-electric converter 12. The optical clock signal may be inputted into the package from either a lateral surface (through a fiber 13) or the bottom surface (through a fiber 13'). Since the package is small, the fibers are directly inserted into the package in place of coupling the optical clock signal by a lens as in the first embodiment. The integrated circuit 10 is connected and fixed on the package 15 by a solder bump 14. Therefore, a bonding pattern on the integrated circuit and a pattern on the package are aligned simultaneously with their connection by the bump 14, thereby facilitating the positioning of the fibers 13, 13' and the optical guide 11.

In the present embodiment, the insulating film is used as the optical guide, thus making it possible to form the optical guide simultaneously in the integrated circuit manufacturing process as well as accurately aligning the optical guide with the photo-electric converter.

Figure 6:
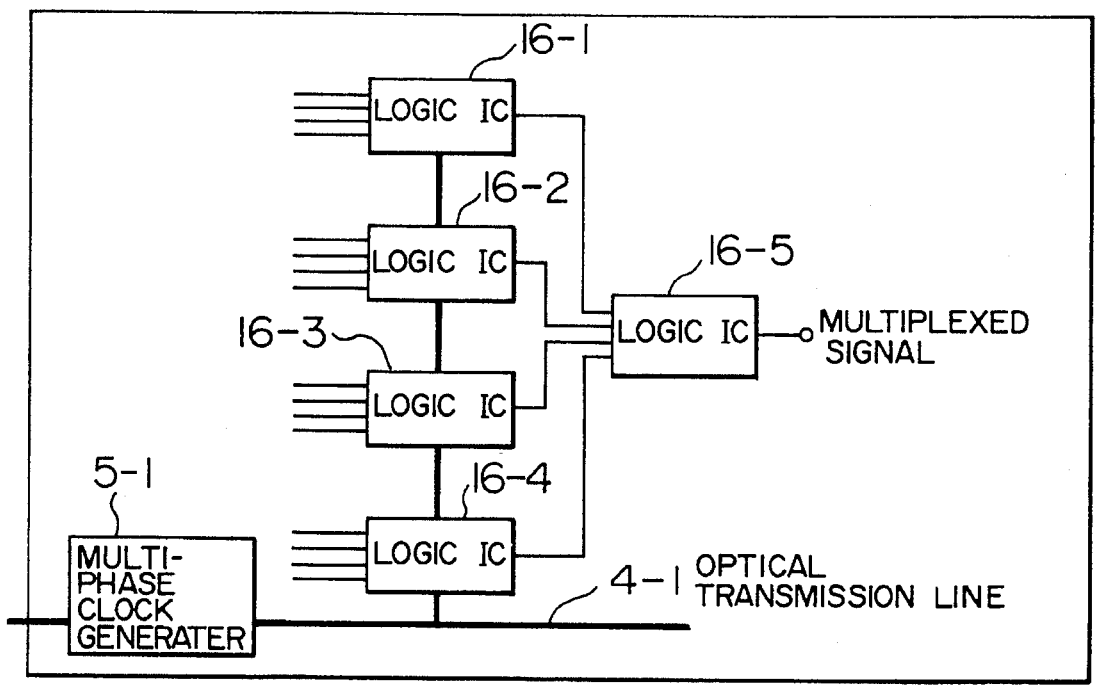
FIG. 6 is a schematic diagram illustrating the construction of a third embodiment of the invention.
Figure 7:
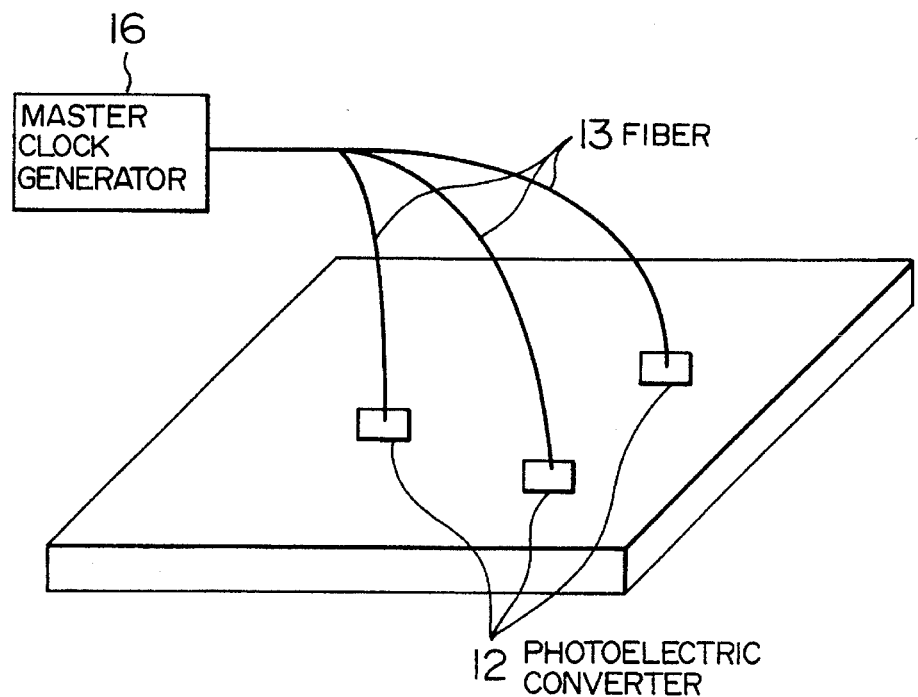
FIG. 7 is a schematic diagram illustrating the construction of a prior art example.

Next, a third embodiment of the invention will be described. In this example, the present invention is applied to a telecommunication apparatus. FIG. 6 illustrates the construction of the third embodiment. Reference numerals 16-1-16-5 designate integrated circuits each for multiplexing four signals. More specifically, four input signals are multiplexed by the respective integrated circuits 16-1–16-4, and then outputs of these integrated circuits 16-1–16-4 are further multiplexed by the integrated circuit 16-5, thereby forming a circuit for multiplexing 16 signals. The integrated circuits 16-1–16-5 are each similar to the configuration shown in FIG. 4. Specifically, each of the integrated circuits 16-1–16-5 has optical guides for distributing optical clock signals and is sealed in a package as shown in FIG. 5.

Reference numeral 5-1 designates a portion for generating clock signals used for this multiplex processing in a construction similar to that shown in FIG. 2. Reference numeral 4-1 designates an optical transmission line for transmitting a clock signal.

Next, the operation of the third embodiment will be described. The integrated circuits 16-1–16-4 respectively employ four clock signals of different phase generated by the multi-phase clock signal generator 5-1. Specifically, from the phase relation of the clock signals as shown FIGS. 3C–3F a clock signal at a speed four times faster than the inputted clock signal is generated by the respective integrated circuits 16-1–16-4, and the inputted four signals are latched therein and multiplexed by a logic OR circuit disposed in the respective integrated circuits 16-1–16-4. In the integrated circuit 16-5, a similar operation is performed with a clock signal at a speed four times faster.

In this example, there are line delays due to the lines coupling the integrated circuits 16-1–16-4 with the integrated circuit 16-5, which, however, may be compensated by adjusting the length of the optical transmission line 4-1. Also, although the integrated circuits 16-1–16-4 need to be supplied with clock signals in the same phase, a very uniform clock signal can be distributed if an optical signal is used, as has been described in connection with the foregoing embodiments.

According to the present invention, a high speed clock signal can be distributed without incurring a deterioration in the waveform thereof.

We claim:

1. A method for distributing a master clock signal to a plurality of integrated circuits with predetermined phase differences, comprising the steps of:

generating a first optical clock signal as a master clock signal;

transmitting the first optical clock signal to a logic processing unit having a plurality of integrated circuits;

generating a plurality of second optical clock signals having predetermined phase differences from the first optical clock signal received in said logic processing unit, wherein said step of generating the plurality of second optical clock signals includes the sub-steps of:

distributing the first optical clock signal, and delaying the distributed first optical clock signal with different delay times in order to make the second optical clock signals; and distributing said second optical clock signals to the respective integrated circuits.

2. A logic processing apparatus, comprising:

a master clock generator generating a first optical clock signal;

a first optical transmission line having one end thereof coupled to said master clock generator; and a logic processing unit coupled to the other end of said first optical transmission line, said logic processing unit including:
- a multi-phase clock generator generating a plurality of second optical clock signals having predetermined phase differences, based on the first optical clock signal,
  - wherein said multi-phase clock generator comprises:
  - an optical branch circuit distributing the first optical clock signal, and
  - a plurality of optical delay lines each delaying the distributed first optical clock signal with a different delay time to make the second optical clock signals,
- a plurality of second optical transmission lines, each having one end thereof coupled to said multi-phase clock generator, and
- a plurality of integrated circuits receiving the second optical clock signals through said second optical transmission lines.

3. A logic processing apparatus according to claim 2, wherein at least one of said integrated circuits includes:

a plurality of photoelectric converters, first optical guides, each having one end thereof coupled to a respective one of said photoelectric converters and the other end thereof coupled together at a substantially central portion of each integrated circuit, and a second optical guide coupled to the other end of all of said first optical guides.

4. A logic processing unit, comprising:

a multi-phase clock generator inputting a first optical clock signal as a master clock signal and generating a plurality of second optical clock signals having predetermined phase differences based on the first optical clock signal,
- wherein said multi-phase clock generator comprises:
- an optical branch circuit distributing the first optical clock signal, and
- a plurality of optical delay lines each delaying the distributed first optical clock signal with a different delay time to make the second optical clock signals;

a plurality of second optical transmission lines, each having one end thereof coupled to said multi-phase generator; and a plurality of integrated circuits receiving the second optical clock signals through said second optical transmission lines.

* * * * *